US010087315B2

(12) United States Patent
Lafleur et al.

(10) Patent No.: US 10,087,315 B2
(45) Date of Patent: Oct. 2, 2018

(54) ENHANCED TACTILE RESPONSIVE AND OPTICALLY TRANSLUCENT FILM FOR PACKAGING

(71) Applicants: Dow Global Technologies LLC, Midland, MI (US); Rohm and Haas Company, Philadelphia, PA (US)

(72) Inventors: Edward E. Lafleur, Holland, PA (US); Claudia Hernandez, Freeport, TX (US); Edwin Nungesser, Horsham, PA (US); Xuming Chen, Katy, TX (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 14 days.

(21) Appl. No.: 15/304,386

(22) PCT Filed: Apr. 15, 2015

(86) PCT No.: PCT/US2015/025900
§ 371 (c)(1),
(2) Date: Oct. 14, 2016

(87) PCT Pub. No.: WO2015/160904
PCT Pub. Date: Oct. 22, 2015

(65) Prior Publication Data

US 2017/0037226 A1 Feb. 9, 2017

Related U.S. Application Data

(60) Provisional application No. 61/979,815, filed on Apr. 15, 2014.

(51) Int. Cl.
*C08L 23/02* (2006.01)
*C08J 5/18* (2006.01)
*C08K 7/16* (2006.01)

(52) U.S. Cl.
CPC ................ *C08L 23/02* (2013.01); *C08J 5/18* (2013.01); *C08K 7/16* (2013.01); *C08J 2323/02* (2013.01);
(Continued)

(58) Field of Classification Search
CPC ......... C08L 23/02; C08L 2207/02; C08J 5/18; C08J 2323/02; C08J 2433/08; C08K 7/16
(Continued)

(56) References Cited

FOREIGN PATENT DOCUMENTS

EP 2431423 A2 * 3/2012 ............ C09D 5/006
EP 2431423 A2 3/2012
(Continued)

OTHER PUBLICATIONS

Newage—Ametek Hardness Testing Basics—(www.hardnesstesters.com/test-types/hardness-testing-basics).*
(Continued)

*Primary Examiner* — Ling Siu Choi
*Assistant Examiner* — Ronald Grinsted

(57) ABSTRACT

A polymeric composition suitable for blown film applications comprising a) 80 to 99.5 percent by weight of a continuous polymeric phase comprising a polyolefin, and b) 0.5 to 20 percent by weight of polymeric particles having i) an average particle diameter of 0.85 to 20 μm; ii) a refractive index from 1.46 to 1.61; iii) an average particle hardness from 1.2367E+10 $N/m^2$ to 8.4617E+10 $N/m^2$; and iv) at least 60% polymerized acrylic monomer units, is disclosed. The polymeric composition can be used to form blown film characterized by having a thickness in the range of from 5 to 350 μm, a modulus of elasticity in the range of from 5 to 133 MPa, a melt strength in the range of from 4 to 40 cN, an elongation at break in the range of from 100 to 1000%, a 45 degree gloss in the range of from 7 to 136 and a softness measured by human panel handfeel-ranking methodology,
(Continued)

Staples
9 1/2 in. Lay Flat
Open Side Of Folder
7 in. Cut from roll of film measured by ISO 8587 Sensory analysis that is higher than a film which does not contain the polymeric composition.

8 Claims, 1 Drawing Sheet

(52) U.S. Cl.
CPC ....... *C08J 2433/08* (2013.01); *C08L 2207/02* (2013.01)

(58) Field of Classification Search
USPC .......................................................... 524/427
See application file for complete search history.

(56) References Cited

FOREIGN PATENT DOCUMENTS

| | | | |
|---|---|---|---|
| JP | 2005008888 | A | 1/2005 |
| JP | 2006111015 | A | 1/2006 |
| WO | WO-2014160607 | A1 | 10/2014 |

OTHER PUBLICATIONS

PCT/US2015/025900, International Preliminary Report on Patentability dated Oct. 18, 2016.
PCT/US2015/025900, International Search Report dated Oct. 22, 2015.
PCT/US2015/025900, Written Opinion of the International Searching Authority dated Oct. 22, 2015.

* cited by examiner

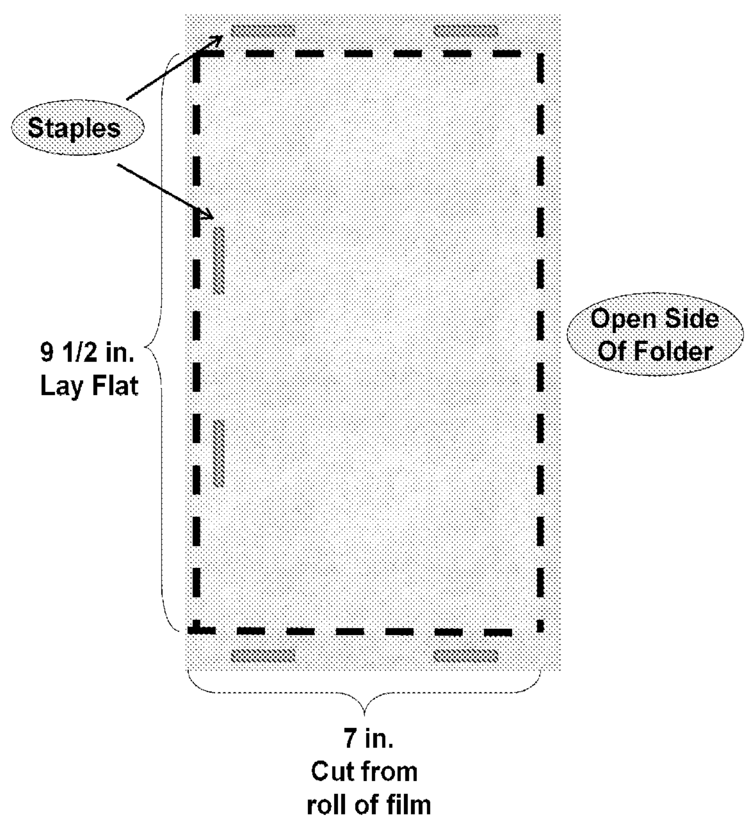
Staples
9 1/2 in.
Lay Flat
Open Side
Of Folder
7 in.
Cut from
roll of film

ENHANCED TACTILE RESPONSIVE AND OPTICALLY TRANSLUCENT FILM FOR PACKAGING

CROSS-REFERENCE TO A RELATED APPLICATION

This application claims the benefit of U.S. Provisional Patent Application No. 61/979,815, filed Apr. 15, 2014, which is incorporated herein by reference in its entirety.

FIELD OF INVENTION

The instant invention relates to a polymeric composition suitable for blown film applications, and blown films made therefrom.

BACKGROUND OF THE INVENTION

This invention relates to novel packaging film with enhanced tactile feel characteristics that were formerly produced by fibrous web, which may be woven or non-woven. Films of the type described in the present invention have also been prepared by embossing plastic sheet to yield esthetically pleasing appearance with low gloss. The short comings of the latter films are the surface roughness, readily experienced when physical contact is made with the film surface, and the appearance of irregularities due to diffuse scattering of visible light. In appearance, these films are translucent, characteristically rough to the touch and noticeably audible with respect to the sound arising from physical contact.

Other techniques have been used to reduce the gloss and surface uniformity of plastic films to yield the highly desirable silk-like feel and appearance. For example, plastic articles can be prepared by a mechanical process to yield film of an irregular rectangular surface. Similarly, a portion of the surface of a plastic film can be embossed to exhibit a scintillating effect.

The short comings of the embossed films are the surface roughness, readily experienced when physical contact is made with the film surface, and the appearance of irregularities due to diffuse scattering of visible light. In appearance, these films are translucent, characteristically rough to the touch and noticeably audible with respect to the sound arising from physical contact. Therefore, a film which overcomes the deficiencies in esthetics and haptics that are prevalent in embossed films would be desirable.

SUMMARY OF THE INVENTION

The instant invention provides a polymeric composition suitable for blown film applications, and blown films made therefrom.

In one embodiment, the instant invention provides a polymeric composition suitable for blown film applications comprising 80 to 99.5 percent by weight of a continuous polymeric phase comprising a polyolefin, and 0.5 to 20 percent by weight of polymeric particles having an average particle diameter of 0.85 to 20 μm; a refractive index from 1.46 to 1.61; an average particle hardness from 1.2367E+10 $N/m^2$ to 8.4617E+10 $N/m^2$; and at least 60% polymerized acrylic monomer units.

In another alternative embodiment, the instant invention further provides a blown film having at least one layer which comprises the inventive polymeric composition.

In an alternative embodiment, the instant invention provides a blown film, in accordance with any of the preceding embodiments, except that the blown film is characterized by having a thickness in the range of from 5 to 350 μm, a modulus of elasticity in the range of from 5 to 133 MPa, a melt strength in the range of from 4 to 40 cN, an elongation at break in the range of from 100 to 1000%, a 45 degree gloss in the range of from 7 to 36 and a softness measured by human panel handfeel-ranking methodology, measured by ISO 8587 Sensory analysis that is higher than a film which does not contain the inventive polymeric composition.

BRIEF DESCRIPTION OF THE DRAWING

FIG. 1 depicts a folder used to evaluate film samples.

DETAILED DESCRIPTION OF THE INVENTION

The instant invention provides a polymeric composition suitable for blown film applications, and blown films made therefrom. The polymeric composition suitable for blown film applications comprises 80 to 99.5 percent by weight of a continuous polymeric phase comprising a polyolefin, and 0.5 to 20 percent by weight of polymeric particles having an average particle diameter of 0.85 to 20 μm; a refractive index from 1.46 to 1.61; an average particle hardness from 1.2367E+10 $N/m^2$ to 8.4617E+10 $N/m^2$; and at least 60% polymerized acrylic monomer units.

Continuous Polymeric Phase

In various embodiments, the continuous polymeric phase is a thermoplastic polymeric matrix material. In various embodiments, the thermoplastic polymeric matrix material comprises polyolefins. Polyolefins include polymers or copolymers of alkenes, those having from two to ten carbon atoms in various embodiments, two to eight carbon atoms in various other embodiments, and two to four carbon atoms in various other embodiments. Examples of polyolefins suitable for use in the base layer include, but are not limited to polypropylene, polyethylene, polybutylene, and copolymers and blends thereof. The weight-average molecular weight of the polyolefin used in this invention is from 20,000 to 500,000 in various embodiments, and is from 50,000 to 300,000 in various other embodiments.

Polyolefin homo and copolymers can also be used. Examples include, but are not limited to the following: polypropylene and polyethylene homo and copolymers containing from 0 to 40 weight percent (wt %) ethylene, propylene, butene, octene and/or hexene.

Commercial grades include but are not limited to VERSIFY™ plastomers, DOWLEX™, ENGAGE™, AFFINITY™, INFUSE™ and LDPE resins, available from The Dow Chemical Company.

Optionally, the continuous polymeric phase may comprise compatible or incompatible blends of polyolefins with other (co)polymers, or may contain inorganic fillers, or additives such as slip aids, anti-block, and anti-oxidants.

The continuous polymeric phase is present in the polymeric composition in the range of from 80 to 99.5 percent by weight. All individual values and subranges between 80 and 99.5 percent by weight are included herein and disclosed herein; for example, the continuous polymeric phase can be present in the polymeric composition in the range of from 81 and 99 percent by weight, from 80 to 85 percent by weight, from 83 to 99.5 percent by weight, from 84 to 98 percent by weight, and from 86 to 99.5 percent by weight.

Polymeric Particles

Polymeric particles comprise organic polymers, preferably addition polymers, and preferably are substantially spherical. Average particle diameter is determined as the arithmetic mean particle diameter. In various embodiments, the polymeric particles have an average particle diameter no less than 0.5 μm. All individual values and subranges of 0.5 μm and higher are included herein and disclosed herein; for example, the polymeric particles can have an average particle diameter of at least 0.7 μm, at least 0.9, at least 1 μm, at least 1.5 μm, at least 2 μm, at least 2.5 μm, at least 3 μm, or at least 3.5 μm. In various embodiments, these particles have an average particle diameter no greater than 15 μm. All individual values and subranges of 15 μm and less are included herein and disclosed herein; for example, the particles can have an average particle diameter of no greater than 10 μm, no greater than 8 μm, no greater than 6 μm, or no greater than 5.5 μm. In various embodiments, the polymeric particles have a particle size distribution indicating a single mode; the width of the particle size distribution at half-height is from 0.1 to 3 μm in various embodiments, and is from 0.2 to 1.5 μm in various other embodiments. The film may contain particles having different average diameters provided that particles of each average diameter have a particle size distribution as described immediately above. The particle size distribution is determined using a particle size analyzer.

Refractive index (RI) values are determined at the sodium D line, where λ=589.29 nm at 20° C., unless specified otherwise. Generally, the refractive index of the polymeric particle is from 1.46 to 1.7. All individual values and subranges from 1.46 to 1.7 are included herein and disclosed herein; for example, the refractive index is from 1.52 to 1.68, from 1.53 to 1.65, or from 1.54 to 1.6. Generally, the refractive index of the continuous polymeric phase is from 1.4 to 1.6. All individual values and subranges from 1.4 to 1.6 are included herein and disclosed herein; for example the refractive index of the continuous polymeric phase is from 1.45 to 1.55, from 1.47 to 1.53, or from 1.48 to 1.52. Generally, the refractive index of the polymeric particle is greater than the refractive index of the continuous polymeric phase in the infrared region, i.e., from 800-2500 nm.

Refractive index differences stated herein are absolute values. Generally, the refractive index difference (i.e., the absolute value of the difference) measured from 800 nm to 2500 nm between the polymeric particle and the continuous polymeric phase is at least 0.06. All individual values and subranges of 0.06 and greater are included herein and disclosed herein; for example, the refractive difference is at least 0.08, at least 0.09, or at least 0.1. Generally, the refractive index difference measured from 800 nm to 2500 nm between the polymeric particle and the continuous polymeric phase is no greater than 0.2. All individual values and subranges of 0.2 and less are included herein and disclosed herein; for example, the refractive index difference is no greater than 0.17, or is no greater than 0.15. Generally, the refractive index difference measured from 400 nm to 800 nm between the polymeric particle and the continuous polymeric phase is at least 0.04. All individual values and subranges of 0.04 and greater are included herein and disclosed herein; for example, the refractive index difference is at least 0.05, at least 0.06, at least 0.07, or at least 0.08. Generally, the refractive index difference measured from 400 nm to 800 nm between the polymeric particle and the continuous polymeric phase is no greater than 0.2, is no greater than 0.15 in various other embodiments, and is no greater than 0.1 in various other embodiments.

In various embodiments, the polymeric particles in the polymeric composition are those having a continuous refractive index gradient ("GRIN" particle, see, e.g., US 2009/0097123). GRIN particles have a refractive index which increases continuously from the center of the particles to the surface. Generally, GRIN particles have a refractive index at the surface from 1.46 to 1.7. All individual values and subranges between 1.46 and 1.7 are included herein and disclosed herein; for example, the refractive index at the surface is from 1.52 to 1.68, from 1.53 to 1.65, or from 1.54 to 1.6. Generally, GRIN particles have a refractive index at the center from 1.46 to 1.7. All individual values and subranges between 1.46 and 1.7 are included herein and disclosed herein, for example, the refractive index at the center is from 1.46 to 1.52, or 1.47 to 1.51, or 1.55 to 1.6, or 1.6 to 1.7.

The GRIN lens layer provides a unique solution to the multilayer film. In the following, is a description of the properties of the micro GRIN lens.

The GRIN lens reduce the loss of light and minimize spherical and chromatic aberration. Because the refractive index of the GRIN sphere lens varies continuously within the lens media a unique focus is defined by light rays that transmit through the lens. A consequence of this is the observation that light rays are bent with the change in refractive index. The bending of the light rays results in, the elimination of light loss through total internal reflection, and the creation of a well defined focal point and focal length, unique to the spherical lens geometry.

The GRIN polymer particles are spherical in geometry and possess unique morphology. There are two well defined cases of GRIN polymer particles: In the less familiar case, which is described as case I, the refractive index of the spherical particle decreases continuously from the surface of the particle to its central core. In the well known second type of GRIN polymer particle, case II; the refractive index of the particle increases continuously from the outer spherical surface of the particle to the inner core. These lens-like polymer particles enhance the refraction of light rays incident upon the polymeric matrix in which these particles are coated or dispersed. The overall effect of high gain in optical intensity, from enhanced light refraction, is a reduction in loss of incident light rays to reflection and diffraction. Consequently, the particles enhance light diffusion, in case I; and transmission with low loss of photons to total internal reflection, in case II.

GRIN particles may have a core derived from a polymer seed used to produce the GRIN particle. Generally, the core of the GRIN particle is no more than 95 wt % of the particle, is no more than 80 wt % in various other embodiments, is no more than 60 wt % in various other embodiments, is no more than 40 wt % in various other embodiments, and is no more than 20 wt % in various other embodiments. The refractive index of a GRIN particle for purposes of calculating a refractive index difference is the refractive index at the particle surface. The refractive index can vary from high in the core to low on the surface of the particle and low in the core and high on the surface of the particle. Hence the center of the particle can have refractive index of 1.61 and surface of 1.40.

The variation in refractive index is measured by the Mach-Zehnder Interference Microscope. The measuring technique, defined as the shearing interference method, is centered on the determination of the optical path difference. The path difference is understood to be the difference between two optical path lengths which are caused by differences in the refractive index and or thickness. The interference-microscopic path difference is the difference between the optical path length in an object and that in its surroundings. The optical path length S is the product of the distance d traversed by the light rays and the refractive index n of the medium that the light rays pass through.

After synthetic preparation, the spheres are evaluated for optical properties (refractive index profile by path difference) by first immersion in a refractive index matching fluid which has refractive index ($N_d$=1.54) at 25° C. The total magnification is approximately 110. The interference or fringe patterns are taken by a CCD camera in which the pixels were estimated, after calibration with a microscope scale bar, to be about 100 nm in the object plane.

The polymeric particles can contain acrylic monomers. Acrylic monomers include acrylic acid (AA), methacrylic acid (MAA), esters of AA and MAA, itaconic acid (IA), crotonic acid (CA), acrylamide (AM), methacrylamide (MAM), and derivatives of AM and MAM, e.g., alkyl (meth)acrylamides. Esters of AA and MAA include, but are not limited to, alkyl, hydroxyalkyl, phosphoalkyl and sulfoalkyl esters, e.g., methyl methacrylate (MMA), ethyl methacrylate (EMA), butyl methacrylate (BMA), hydroxyethyl methacrylate (HEMA), hydroxyethyl acrylate (HEA), hydroxypropyl methacrylate (HPMA), hydroxybutyl acrylate (HBA), methyl acrylate (MA), ethyl acrylate (EA), butyl acrylate (BA), 2-ethylhexyl acrylate (EHA), cyclohexyl methacrylate (CHMA), benzyl acrylate (BzA) and phosphoalkyl methacrylates (e.g., PEM). Generally, the polymeric particles comprise at least 60 mole percent (mole %) of acrylic monomer units. All individual values and subranges of 60 mole % and greater are included herein and disclosed herein; for example, the polymeric particles can include at least 65 mole % of acrylic monomer units, at least 70 mole % of acrylic monomer units, at least 75 mole % of acrylic monomer units, or at least 80 mole % of acrylic monomer units. The polymeric particles can also include styrenic monomers which can include styrene, α-methylstyrene; 2-, 3-, or 4-alkylstyrenes, including methyl- and ethyl-styrenes. In an embodiment, the styrenic monomer is styrene.

Generally, the polymeric particles comprise at least 70 mole % of acrylic and styrenic monomer units. All individual values and subranges of 70 mole % and greater are included herein and disclosed herein; for example, the polymeric particles comprise at least 80 mole % of acrylic and styrenic monomer units, at least 90 mole % of acrylic and styrenic monomer units, at least 95 mole % of acrylic and styrenic monomer units, or at least 97 mole % of acrylic and styrenic monomer units. Generally, the polymeric particle also comprises from 0 to 5 mole % of acid monomer units (e.g., acrylic acid (AA), methacrylic acid (MAA), itaconic acid (IA), crotonic acid (CA), or from 0.5 to 4% AA and/or MAA, and may also contain small amounts of residues of vinyl monomers.

The polymeric particles can also contain crosslinkers. Crosslinkers are monomers having two or more ethylenically unsaturated groups, or coupling agents (e.g., silanes) or ionic crosslinkers (e.g., metal oxides). Crosslinkers having two or more ethylenically unsaturated groups may include, e.g., divinylaromatic compounds, di-, tri- and tetra-acrylate or methacrylate esters, di-, tri- and tetra-allyl ether or ester compounds and allyl acrylate or allyl methacrylate. Examples of such monomers include divinylbenzene (DVB), trimethylolpropane diallyl ether, tetraallyl pentaerythritol, triallyl pentaerythritol, diallyl pentaerythritol, diallyl phthalate, diallyl maleate, triallyl cyanurate, Bisphenol A diallyl ether, allyl sucroses, methylene bisacrylamide, trimethylolpropane triacrylate, allyl methacrylate (ALMA), ethylene glycol dimethacrylate (EGDMA), hexane-1,6-diol diacrylate (HDDA) and butylene glycol dimethacrylate (BGDMA). Generally, the amount of polymerized crosslinker residue in the polymeric particle is no more than 10%. All individual values and subranges of 10% or less are included herein and disclosed herein; for example, the polymerized crosslinker residue in the polymeric particles is no more than 9%, no more than 8%, no more than 7%, or no more than 6%. Generally, the amount of polymerized crosslinker residue in the polymeric particle is at least 0.1%. All individual values and subranges of 0.1% or greater are included herein and disclosed herein; for example, the amount of polymerized crosslinker residue in the polymeric particle is at least 0.5%, at least 1%, at least 2%, or at least 3%. Generally, if crosslinkers are present, they have a molecular weight from 100 to 250. All individual values and subranges from 100 to 250 are included herein and disclosed herein; for example, the crosslinkers can have a molecular weight from 110 to 230, from 110 to 200, or from 115 to 160. Generally, crosslinkers are difunctional or trifunctional, i.e., they are diethylenically or triethylenically unsaturated, respectively.

In an alternate embodiment, a siloxane coupling agent from 0.1% to 10% by weight, preferably 3% to 7%, based on the dry weight of said polymeric particle, is added to the polymeric polymer. By "aminosilane" herein is meant a non-polymeric organofunctional alkoxysilane molecule bearing at least one primary or secondary amino group such as, for example, (3-aminopropyl)-triethoxysilane [CAS#919-30-2], (3-aminopropyl)-diethoxy-methylsilane, (3-aminopropyl)-dimethyl-ethoxysilane, (3-aminopropyl)-trimethoxysilane [CAS#13822-56-5], and N-beta-(aminoethyl)-gamma-aminopropyltrimethoxysilane. The siloxane coupling agent is added to the polymeric particles after preparation but prior to spray drying.

The polymeric particles are generally prepared in an aqueous medium by known emulsion polymerization techniques, followed by spray drying of the resulting polymer latex. Spray drying typically results in clumps of polymeric particles having an average diameter of 0.5 to 15 μm.

The polymeric particles are generally present in a range of 0.5 weight (wt) % to 20 wt %. All individual values and ranges from 0.5 wt % to 20 wt % are included herein and disclosed herein; for example, the polymeric particles can be present in the skin layer in a range of 1 wt % to 20 wt %, 1 wt % to 17 wt %, 2 wt % to 17 wt %, 3 wt % to 20 wt %, and 4 wt % to 20 wt %.

Optional Components

The polymeric composition may further include optionally one or more pigments. The polymeric composition may comprise 0 to 10 percent by weight of one or more pigments. All individual values and subranges from 0 to 10 weight percent are included herein and disclosed herein; for example, the weight percent of pigments can be from a lower limit of 0.1, 0.2, 0.3, 0.5, 1, 2, 3, 4, or 5 weight percent to an upper limit of 1, 2, 3, 4, 5, 6, 7, 8, 9, or 10 weight percent. For example, polymeric composition may comprise 0 to 9 percent by weight of one or more pigments; or in the alternative, polymeric composition may comprise 0.1 to 8 percent by weight of one or more pigments; or in the alternative, polymeric composition may comprise 0.1 to 7 percent by weight of one or more pigments; or in the alternative, polymeric composition may comprise 0.1 to 6 percent by weight of one or more pigments. Such pigments include, but are not limited to, calcium carbonate and titanium dioxide, which is commercially available under the tradename Ti-Pure™ from the DuPont, Wilmington, Del., USA. Mixtures of any two or more pigments can also be used.

End Use Applications

The polymeric composition according to the present invention can be formed into a film and used in various packaging applications, e.g. food packaging applications. The inventive polymeric composition may be formed into a film via, for example, a blown film process. In one embodiment, the polymeric composition is formed into a single layer film via a blown film process. In another embodiment, polymeric composition may be formed into a multi-layer blown film structure. In another embodiment, the polymeric composition may be formed into a single layer or a multi-layer blown film structure associated with one or more substrates, wherein at least one layer of the blown film comprises the polymeric composition. The blown films prepared according to the present invention may be used in various packaging applications, e.g. food packaging applications such as fresh cut produce, and snacks. The blown films according to the present invention have a thickness in the range of from 5 μm to 350 μm. The blown films according to the present invention have a modulus of elasticity in the range of from 5 MPa to 133 MPa, for example from 8 MPa to 121 MPa, 20 MPa to 100 MPa, 35 MPa to 85 MPa, or 35 MPa to 65 MPa. The blown films according to the present invention have a melt strength in the range of 4 cN to 40 cN, for example, from 15 cN to 35 cN. The blown films have an elongation at break in the range of from 100% to 1000%, for example from 350% to 900%. The blown films have a 45 degree gloss in the range of from 7 to 36, for example, from 12 to 14.5. The blown films have a softness measured by human panel handfeel-ranking methodology, measured by ISO 8587 Sensory analysis that is higher than a film which does not contain the inventive polymeric composition.

EXAMPLES

Example 1 (Pre-Seed Polymer)

This example illustrates the preparation of crosslinked polymer pre-seeds of 0.25 μm in diameter for making large seed particles in an aqueous dispersion. The following mixtures A-C were prepared with deionized water, as shown in Table I, below.

TABLE I

| Mixture | Component | Parts by Weight |
|---|---|---|
| A1 | Water | 180 |
| | Sodium Carbonate | 0.40 |
| B1 | n-Butyl Acrylate | 98.0 |
| | Allyl Methacrylate | 1.75 |
| | 1,4-Butanediol Diacrylate | 0.25 |
| | 22.5% aqueous Sodium Dodecylbenzenesulfonate | 2.22 |
| | Water | 40.8 |
| C1 | Sodium Persulfate | 0.06 |
| | Water | 11.9 |

A reactor equipped with stirrer and condenser and blanked with nitrogen was charged with Mixture A1 and heated to 83° C. 10% of emulsified Mixture B1 and 25% of Mixture C1 were then added to the reactor. The temperature was maintained at 83° C. and the mixture was stirred for 60 minutes, after which the remaining Mixture B1 and Mixture C1 were added to the reactor with stirring over a period of 120 minutes. Stirring continued at 83° C. for 90 minutes, after which the reactor contents were cooled to room temperature. The particle size of the resulting particle pre-seeds was 0.25 μm as measured by a Brookhaven Instruments particle size analyzer BI-90.

Example 2 (Polymer Seeds)

In this example the pre-seed particles in the emulsion of Example 1 were grown to 0.56 μm diameter using n-butyl acrylate, styrene, and 1-hexanethiol. The following mixtures A2-G2 were prepared with deionized water, as shown in Table II, below.

TABLE II

| Mixture | Component | Parts by Weight |
|---|---|---|
| A2 | Sodium Carbonate | 0.08 |
| | 9.76% aqueous Sodium Dodecylbenzenesulfonate | 0.01 |
| | Water | 156.00 |
| B2 | 30.10% aqueous emulsion from Example 1 | 29.80 |
| C2 | n-Butyl Acrylate | 81.80 |
| | Styrene | 18.20 |
| | 9.76% aqueous Sodium Dodecylbenzenesulfonate | 4.53 |
| | Water | 57.50 |
| D2 | 1-Hexanethiol | 18.80 |
| | 9.76% aqueous Sodium Dodecylbenzenesulfonate | 0.58 |
| | Water | 15.00 |
| E2 | Sodium Persulfate | 0.11 |
| | Water | 47.40 |
| F2 | t-Butyl Hydroperoxide 70% | 0.30 |
| | Water | 15.00 |
| G2 | Sodium Formaldehyde Sulfoxylate | 0.20 |
| | Water | 6.67 |

Mixture A2 was added to the reactor of Example 1 and heated to 88° C. with stirring. The air in the reactor was replaced with nitrogen. When the reactor temperature stabilized at 88° C., Mixture B2 was charged into the reactor. Emulsified Mixtures C2 and D2, and Mixture E2 were then added to the reactor, with stirring, over a period of 300 minutes. Stirring was continued at 88° C. for 90 minutes. The reactor contents were cooled to 65° C. Mixtures F2 and G2 were added and the reactor contents were maintained at 65° C. with stirring for 1 hour, after which the reactor contents were cooled to room temperature. The resulting emulsion particles had a diameter of 0.56 μm as measured by a Brookhaven Instruments particle size analyzer BI-90.

Example 3 (GRIN Sphere Composition)

In this example, the particles in the emulsion of Example 2 are expanded to create 5 μm diameter divergent lenses using n-butyl acrylate and allyl methacrylate in Stage I which is then followed by Stage II copolymerization of methyl methacrylate and ethyl acrylate. The following mixtures A3-G3 were prepared with deionized water, as shown in Table III, below.

TABLE III

| Mixture | Component | Parts by Weight |
|---|---|---|
| | Stage I | |
| A3 | Water | 138.50 |
| B3 | | |
| | Aqueous emulsion from Example 2 at 29.88% solids | 0.105 |
| C3 | n-Butyl Acrylate | 76.80 |
| | Allyl Methacrylate | 3.20 |
| | 10% aqueous Sodium Dodecylbenzenesulfonate | 0.28 |
| | Water | 33.12 |
| D3 | t-Butyl Peroctoate | 0.427 |
| | 10% aqueous Sodium Dodecylbenzenesulfonate | 0.003 |
| | Water | 2.96 |
| | Stage II | |
| E3 | Methyl Methacrylate | 19.20 |
| | Ethyl Acrylate | 0.80 |
| F3 | Sodium Formaldehyde Sulfoxylate | 0.062 |
| | Water | 6.67 |
| | 10% aqueous Sodium Dodecylbenzenesulfonate | 0.017 |
| G3 | t-Butyl Hydroperoxide 70% | 0.089 |
| | Water | 10.05 |
| | 10% aqueous Sodium Dodecylbenzenesulfonate | 0.037 |

A3 was added to the reactor of Example 2 and was heated to 90° C. with stirring. The air in the reactor was replaced with nitrogen. When the reactor temperature stabilized at 90° C., Mixture B3 was charged into the reactor. Mixture C3 was emulsified with a homogenizer and charged into the reactor and was stirred at 60° C. for 1 hour. Mixture D3 was emulsified with a homogenizer and charged into the reactor. After 1 hour of agitation at 60° C., the reactor was gradually heated to 65-70° C. while an exothermic polymerization took place. After peak temperature was reached, agitation continued while the reactor was cooled to 73° C. in 30 minutes. Half of Mixture F3 was then charged to the reactor. Mixtures E3, the remainder of F3, and G3 were then separately added into the reactor over a period of 2 hours. The temperature was maintained between 73-75° C. and stirring continued for 1 hour before the reactor was cooled to room temperature. The resulting emulsion particles had a diameter of 5 μm as measured by a Coulter Corporation Multisizer IIE particle size analyzer.

Example 4 (Plain Sphere Composition)

In this example, the particles in the emulsion of Example 2 were expanded to create 5 μm diameter converging lenses using methyl methacrylate and allyl methacrylate. The following mixtures A3-C3 were prepared with deionized water as shown in Table IV, below.

TABLE IV

| Mixture | Component | Parts by Weight |
|---|---|---|
| | Stage I | |
| A3 | Water | 138.50 |
| | Aqueous emulsion from Example 2 at 29.88% solids | 0.105 |
| B3 | Methyl Methacrylate | 76.80 |
| | Allyl Methacrylate | 3.20 |
| | 10% aqueous Sodium Dodecylbenzenesulfonate | 0.28 |
| | Water | 33.12 |
| C3 | t-Butyl Peroctoate | 0.427 |
| | 10% aqueous Sodium Dodecylbenzenesulfonate | 0.003 |
| | Water | 2.96 |

A3 was added to the reactor of Example 2 and was heated to 60° C. with stirring. The air in the reactor was replaced with nitrogen. When the reactor temperature stabilized at 60° C., Mixture B3 was charged into the reactor. Mixture C3 was emulsified with a homogenizer and charged into the reactor. The contents of the reactor were stirred at 60° C. for 1 hour. Mixture D3 was emulsified with a homogenizer and charged into the reactor. After 1 hour agitation at 60° C., the reactor was gradually heated to 80° C. while an exothermic polymerization takes place. After reaching peak temperature, agitation was continued at 88° C. until polymerization showed >92% conversion. After polymerization, the reactor was cooled to 73° C. in 30 minutes. The temperature was maintained at 73-75° C. and stirring was continued for 1 hour before the reactor was cooled to room temperature. The resulting emulsion particles had a diameter of 5 μm as measured by a Coulter Corporation Multisizer IIE particle size analyzer.

Comparative Example A

Film samples were prepared by melt extrusion blown process from pellets of the neat polymer resin. Affinity 1880G resin (Dow Chemical polyolefin) was melt processed in a Leistritz extruder (Micro18 twin extruder) at barrel temperature ranging from 150 to 220° C. The melt and extrusion process produced a uniform polymer melt in the form of filaments which were quenched in a water bath. The melt extrusion was followed by pelletization and drying with an air knife. Additional drying of the pellets was later carried out at 60° C. in a vacuum oven, before extrusion blowing into a thin film using a single screw extruder at barrel temperatures in the range of 200 to 210° C. The film samples obtained were 0.06 to 0.09 mm in thickness. The data are given in Tables V, VI, and VII below.

Examples 5-8

Film samples were prepared by the melt extrusion blown process described in Comparative Example A, from pellets derived from a blend of Affinity 1880G neat polymer resin (Dow Chemical polyolefin) and spray dried to form 5 μm powder particles described in Example 3. The resin powder blend was melt processed in a Leistritz extruder (Micro18 twin extruder) at barrel temperature ranging from 150 to 220° C. The melt and extrusion process produced uniform polymer melt in the form of filaments which were quenched in a water bath. The melt extrusion was followed by pelletization and drying with an air knife. Additional drying of the pellets was later carried out at 60° C. in a vacuum oven, before extrusion blowing into thin film using a single screw extruder at barrel temperatures in the range of from 200 to 210° C. The film samples obtained were 0.07 to 0.13 mm in thickness. The data are given in TABLEs V, VI, and VII below.

Comparative Example B

Film samples were prepared by melt extrusion blown process from pellets of neat polymer resin. Infuse 9100 resin (Dow Chemical polyolefin) was melt processed in a Leistritz extruder (Micro18 twin extruder) at barrel temperature in the range of from 150 to 220° C. The melt and extrusion process produced uniform polymer melt in the form of filaments which were quenched in a water bath. The melt extrusion was followed by pelletization and drying with an air knife. Additional drying of the pellets was later carried out at 60° C. in a vacuum oven, before extrusion blowing into a thin film using a single screw extruder at barrel temperatures that ranged from 200 to 210° C. The film samples obtained were 0.06 to 0.09 mm in thickness. The data are given in TABLEs V, VI, and VII below.

Examples 9-11

Film samples were prepared by the melt extrusion blown process described in comparative Example A from pellets derived from a blend of Infuse 9100 neat polymer resin (Dow Chemical polyolefin) and spray dried 5 μm powder particles described in Example 3. The resin powder blend was melt processed in a Leistritz extruder (Micro18 twin extruder) at barrel temperature ranging from 150 to 220° C. The melt and extrusion process produced uniform polymer melt in the form of filaments which were quenched in a water bath. The melt extrusion was followed by pelletization and drying with an air knife. Additional drying of the pellets was later carried out at 60° C. in a vacuum oven, before extrusion blowing into thin film using a single screw extruder at barrel temperatures in the range of from 200 to 210° C. The film samples obtained were 0.07 to 0.12 mm in thickness. The data are given in TABLEs V, VI, and VII below.

Comparative Example C

Film samples were prepared by melt extrusion blown process from pellets of a neat polymer resin. Dowlex 2045G resin (Dow Chemical polyolefin) was melt processed in a Leistritz extruder (Micro18 twin extruder) at barrel temperature in the range of from 150 to 220° C. The melt and extrusion process produced uniform polymer melt in the form of filaments which were quenched in a water bath. The melt extrusion was followed by pelletization and drying with an air knife. Additional drying of the pellets was later carried out at 60° C. in a vacuum oven, before extrusion blowing into a thin film using a single screw extruder at barrel temperatures in the range of from 200 to 210° C. The film samples obtained were 0.02 mm in thickness. The data are given in TABLEs V, VI, and VII below.

Examples 12-14

Film samples were prepared by the melt extrusion blown process described in comparative Example A, from pellets derived from a blend of the neat polymer resin Dowlex 2045G (Dow Chemical polyolefin) and spray dried 5 μm powder particles described in Example 3. The resin powder blend was melt processed in a Leistritz extruder (Micro18 twin extruder) at barrel temperature in the range of from 150 to 220° C. The melt and extrusion process produced uniform polymer melt in the form of filaments which were quenched in a water bath. The melt extrusion was followed by pelletization and drying with an air knife. Additional drying of the pellets was later carried out at 60° C. in a vacuum oven, before extrusion blowing into thin film using a single screw extruder at barrel temperatures in the range of from 200 to 210° C. The film samples obtained were 0.04 to 0.06 mm in thickness. The data are given in TABLEs V, VI, and VII below.

TABLE V

| Example | Affinity 1880G | Infuse 9100 | Dowlex 2045G | PRD-137 |
|---|---|---|---|---|
| A | 100.0 | 0.0 | 0.0 | 0.0 |
| 5 | 95.0 | 0.0 | 0.0 | 5.0 |
| 6 | 90.0 | 0.0 | 0.0 | 10.0 |
| 7 | 80.0 | 0.0 | 0.0 | 20.0 |
| 8 | 70.0 | 0.0 | 0.0 | 30.0 |
| B | 0.0 | 100.0 | 0.0 | 0.0 |
| 9 | 0.0 | 95.0 | 0.0 | 5.0 |
| 10 | 0.0 | 90.0 | 0.0 | 10 |
| 11 | 0.0 | 80.0 | 0.0 | 20 |
| C | 0.0 | 0.0 | 100.0 | 0.0 |
| 12 | 0.0 | 0.0 | 95.0 | 5.0 |
| 13 | 0.0 | 0.0 | 90.0 | 10.0 |
| 14 | 0.0 | 0.0 | 80.0 | 20.0 |

TABLE VI

| Gloss measurements for plastic films | | | | | | | |
|---|---|---|---|---|---|---|---|
| Example | 20°gloss | 20°gloss std | 45°gloss | 60°gloss | 60°gloss std | 85°gloss | 85°gloss std |
| A | 27.4 | 0.2 | 51.7 | 33.4 | 0.9 | 8.9 | 0.2 |
| 5 | 8.9 | 0.5 | 36.9 | 23.4 | 6.7 | 11.5 | 4.1 |
| 6 | 4.5 | 0.4 | 22.0 | 17.9 | 1.1 | 9.0 | 2.5 |
| 7 | 1.5 | 0.0 | NM | 6.7 | 0.5 | 4.8 | 1.5 |
| 8 | NM | NM | NM | NM | NM | NM | NM |
| B | 23.4 | 0.8 | | 41.3 | 2.6 | 28.5 | 2.5 |
| 9 | 7.2 | 0.5 | 32.9 | 26.9 | 2.4 | 18.1 | 5.3 |
| 10 | 2.8 | 0.1 | 21.8 | 14.0 | 1.2 | 4.7 | 0.9 |
| 11 | 2.0 | 0.0 | 9.4 | 8.8 | 0.2 | 2.0 | 0.5 |
| C | 19.8 | 0.9 | 30.1 | 53.0 | 3.0 | 68.3 | 3.2 |
| 12 | 5.5 | 0.1 | 13.2 | 17.2 | 2.2 | 14.4 | 5.4 |
| 13 | 2.7 | 0.3 | 16.6 | 11.8 | 2.3 | 4.7 | 1.4 |
| 14 | 2.1 | 0.0 | 7.4 | 11.8 | 0.5 | 6.3 | 0.6 |

NM = Not measured

TABLE VII

Tensile properties for extrusion blown film samples

| Example | Sample | Thickness (mm) | MoE (MPa) | Stress @100% (MPa) | Stress Yield (MPa) | Stress Max (MPa) | Elongation @ Break (%) | Toughness (MJ/m$^3$) |
|---|---|---|---|---|---|---|---|---|
| A | 1 | 0.09 | 32.70 | 4.95 | 2.47 | 33.80 | 632.00 | 70.20 |
| | 2 | 0.09 | 40.40 | 5.06 | 2.32 | 33.00 | 627.00 | 70.50 |
| | 3 | 0.06 | 44.50 | 6.58 | 2.74 | 39.50 | 595.00 | 80.20 |
| | 4 | 0.09 | 47.30 | 7.07 | 2.79 | 29.50 | 557.00 | 68.70 |
| | 5 | 0.08 | 43.50 | 7.58 | 3.28 | 41.00 | 593.00 | 92.30 |
| | Ave | 0.08 | 41.68 | 6.25 | 2.72 | 35.36 | 600.80 | 76.38 |
| | ± | 0.01 | 5.59 | 1.19 | 0.37 | 4.78 | 30.30 | 10.00 |
| 5 | 1 | 0.07 | 36.00 | 5.79 | 1.90 | 34.50 | 545.00 | 65.80 |
| | 2 | 0.07 | 37.80 | 6.39 | 2.32 | 36.40 | 537.00 | 70.00 |
| | 3 | 0.06 | 36.60 | 6.67 | 2.51 | 41.90 | 552.00 | 81.10 |
| | 4 | 0.07 | 38.30 | 5.79 | 1.89 | 32.90 | 539.00 | 63.50 |
| | 5 | 0.07 | 36.40 | 6.03 | 2.22 | 32.20 | 529.00 | 62.50 |
| | Ave | 0.07 | 37.02 | 6.13 | 2.17 | 35.58 | 540.40 | 68.58 |
| | ± | 0.00 | 0.98 | 0.39 | 0.27 | 3.89 | 8.65 | 7.57 |
| 6 | 1 | 0.07 | 43.10 | 7.36 | 2.30 | 37.50 | 502.00 | 71.00 |
| | 2 | 0.08 | 42.50 | 7.36 | 2.45 | 34.20 | 486.00 | 64.20 |
| | 3 | 0.08 | 40.30 | 7.40 | 2.57 | 36.10 | 501.00 | 69.70 |
| | 4 | 0.07 | 45.70 | 7.63 | 2.45 | 39.60 | 510.00 | 76.20 |
| | 5 | 0.08 | 42.10 | 7.05 | 2.29 | 34.80 | 510.00 | 68.30 |
| | Ave | 0.08 | 42.74 | 7.36 | 2.41 | 36.44 | 501.80 | 69.88 |
| | ± | 0.00 | 1.96 | 0.21 | 0.12 | 2.18 | 9.81 | 4.36 |
| 7 | 1 | 0.14 | 13.53 | 2.59 | 1.14 | 16.41 | 691.00 | 43.00 |
| | 2 | 0.13 | 12.30 | 2.58 | 1.16 | 17.60 | 705.00 | 47.60 |
| | 3 | 0.14 | 14.21 | 2.68 | 1.16 | 17.37 | 706.00 | 47.40 |
| | 4 | 0.13 | 11.90 | 2.56 | 1.20 | 20.10 | 734.00 | 53.90 |
| | 5 | 0.13 | 14.22 | 2.34 | 0.93 | 15.63 | 688.00 | 40.30 |
| | Ave | 0.13 | 13.23 | 2.55 | 1.12 | 17.42 | 704.80 | 46.44 |
| | ± | 0.00 | 1.08 | 0.13 | 0.11 | 1.69 | 18.21 | 5.18 |
| 9 | 1 | 0.11 | 13.58 | 2.68 | 1.23 | 21.80 | 816.00 | 67.00 |
| | 2 | 0.12 | 13.62 | 2.46 | 1.11 | 20.10 | 798.00 | 58.30 |
| | 3 | 0.12 | 11.95 | 2.37 | 1.12 | 20.10 | 802.00 | 57.70 |
| | 4 | 0.11 | 10.29 | 2.45 | 1.20 | 20.50 | 764.00 | 56.50 |
| | 5 | 0.12 | 12.21 | 2.25 | 1.01 | 17.48 | 756.00 | 48.20 |
| | Ave | 0.12 | 12.33 | 2.44 | 1.13 | 20.00 | 787.20 | 57.54 |
| | ± | 0.01 | 1.37 | 0.16 | 0.09 | 1.57 | 25.87 | 6.68 |
| 10 | 1 | 0.07 | 9.82 | 1.60 | 0.69 | 15.31 | 819.00 | 41.70 |
| | 2 | 0.05 | 10.91 | 1.72 | 0.75 | 15.44 | 773.00 | 38.20 |
| | 3 | 0.06 | 6.47 | 1.44 | 0.72 | 12.33 | 765.00 | 31.00 |
| | 4 | 0.07 | 12.04 | 2.44 | 1.08 | 21.40 | 733.00 | 55.50 |
| | 5 | 0.07 | 12.29 | 2.37 | 1.10 | 19.77 | 692.00 | 48.60 |
| | Ave | 0.06 | 10.31 | 1.92 | 0.87 | 16.85 | 756.40 | 43.00 |
| | ± | 0.01 | 2.36 | 0.46 | 0.21 | 3.67 | 47.34 | 9.44 |
| 11 | 1 | 0.04 | 15.00 | 2.26 | 1.27 | 13.79 | 741.00 | 36.30 |
| | 2 | 0.07 | 12.08 | 2.37 | 1.29 | 17.08 | 726.00 | 43.00 |
| | 3 | 0.08 | 14.43 | 2.13 | 1.16 | 14.39 | 765.00 | 39.10 |
| | 4 | 0.08 | 14.15 | 2.38 | 1.16 | 15.99 | 658.00 | 38.40 |
| | 5 | 0.08 | 14.03 | 2.11 | 1.00 | 8.82 | 552.00 | 21.10 |
| | 6 | 0.09 | 13.63 | 2.26 | 1.14 | 15.04 | 669.00 | 37.40 |
| | Ave | 0.07 | 13.89 | 2.25 | 1.17 | 14.19 | 685.17 | 35.88 |
| | ± | 0.02 | 1.00 | 0.11 | 0.10 | 2.88 | 77.32 | 7.59 |
| C | 1 | 0.02 | 115.00 | 9.92 | 7.85 | 46.60 | 616.00 | 104.30 |
| | 2 | 0.02 | 99.70 | 12.08 | 10.50 | 69.90 | 661.00 | 160.10 |
| | 3 | 0.02 | 97.50 | 10.60 | 8.89 | 56.50 | 635.00 | 125.10 |
| | 4 | 0.03 | 96.60 | 8.98 | 7.09 | 40.80 | 606.00 | 92.00 |
| | 5 | 0.02 | 162.10 | 12.83 | 9.30 | 18.45 | 384.00 | 53.30 |
| | 6 | 0.03 | 130.80 | 10.26 | 8.27 | 40.50 | 597.00 | 96.60 |
| | Ave | 0.02 | 116.95 | 10.78 | 8.65 | 45.46 | 583.17 | 105.23 |
| | ± | 0.00 | 25.78 | 1.43 | 1.19 | 17.30 | 100.20 | 35.64 |
| 12 | 1 | 0.04 | 119.80 | 10.40 | 8.15 | 44.10 | 589.00 | 106.00 |
| | 2 | 0.05 | 128.30 | 9.57 | 7.23 | 39.10 | 557.00 | 90.00 |
| | 3 | 0.04 | 154.50 | 10.79 | 7.89 | 47.60 | 587.00 | 113.10 |
| | 4 | 0.05 | 136.30 | 10.90 | 8.34 | 48.40 | 578.00 | 113.10 |
| | 5 | 0.06 | 106.80 | 9.46 | 7.60 | 43.60 | 599.00 | 104.20 |
| | 6 | 0.05 | 151.40 | 10.40 | 7.78 | 42.50 | 567.00 | 99.40 |
| | Ave | 0.05 | 132.85 | 10.25 | 7.83 | 44.22 | 579.50 | 104.30 |
| | ± | 0.01 | 18.41 | 0.61 | 0.40 | 3.42 | 15.44 | 8.79 |
| 13 | 1 | 0.06 | 132.90 | 9.57 | 6.78 | 37.60 | 540.00 | 85.70 |
| | 2 | 0.06 | 91.80 | 9.68 | 7.47 | 35.90 | 493.00 | 76.40 |
| | 3 | 0.06 | 115.20 | 10.04 | 7.51 | 39.50 | 510.00 | 86.30 |
| | 4 | 0.05 | 92.20 | 9.70 | 7.71 | 40.10 | 519.00 | 86.30 |
| | 5 | 0.06 | 128.10 | 11.11 | 8.33 | 43.70 | 511.00 | 94.90 |
| | 6 | 0.05 | 119.80 | 9.84 | 7.31 | 37.00 | 500.00 | 79.10 |

TABLE VII-continued

Tensile properties for extrusion blown film samples

| Example | Sample | Thickness (mm) | MoE (MPa) | Stress @100% | Stress Yield (MPa) | Stress Max | Elongation @ Break (%) | Toughness (MJ/m$^3$) |
|---|---|---|---|---|---|---|---|---|
| | Ave | 0.06 | 113.33 | 9.99 | 7.52 | 38.97 | 512.17 | 84.78 |
| | ± | 0.00 | 17.64 | 0.57 | 0.51 | 2.80 | 16.39 | 6.49 |
| 14 | 1 | 0.06 | 101.80 | 8.82 | 6.50 | 27.90 | 499.00 | 64.60 |
| | 2 | 0.06 | 92.90 | 8.26 | 6.05 | 23.40 | 469.00 | 53.80 |
| | 3 | 0.06 | 93.90 | 9.06 | 6.79 | 24.40 | 467.00 | 56.80 |
| | 4 | 0.06 | 105.20 | 8.57 | 6.36 | 26.60 | 500.00 | 62.60 |
| | 5 | 0.07 | 89.50 | 7.72 | 5.74 | 24.20 | 502.00 | 56.70 |
| | Ave | 0.06 | 96.66 | 8.49 | 6.29 | 25.30 | 487.40 | 58.90 |
| | ± | 0.00 | 6.56 | 0.52 | 0.41 | 1.88 | 17.76 | 4.51 |

Test Methods

Tensile properties were evaluated using ASTM D882.

For each gloss measurement, the plastic films were positioned against a 194 mm×286 mm plain white chart (Leneta Company, Form B#4023) and measured in triplicate for 20 degree, 60 degree and 85 degree specular gloss using a Micro-TRI-Gloss meter (Byk-Gardner GmbH, catalogue number 4448).

High gloss was measured using ASTM D523 and low gloss was measured using ASTM C346.

45 degree gloss was measured according to ASTM 2457 (Standard Test Method for Specular Gloss of Plastic Films and Solid Plastics).

Toughness was measured according to ASTM D882

Handfeel Sensory Analysis—Methodology Ranking was measured according to ISO 8587.

Examples 15-21: Handfeel Analysis

Part I

All multilayer film samples were fabricated the same way and had same composition on layers #2 and #3, only changing the formulation on the skin layer #1. They had very similar thickness and same width (9.5 in), which provides good uniformity for good comparison. The sample compositions are shown in Table VIII, below.

TABLE VIII

| Example | Layer #1 Outside | Gauge (mil) | Layer #2 Core | Gauge (mil) | Layer #3 Inside | Gauge (mil) | Total Total Gauge (mil) |
|---|---|---|---|---|---|---|---|
| 15 | 100% Affinity 1880 G | 0.5 | 60% Dowlex2045 + 40% LD641i | 1.0 | 60% Dowlex2045 + 40% LD641i | 0.5 | 2.0 |
| 16 | 90% Affinity 1880G + 10% Example 3 | 0.5 | 60% Dowlex2045 + 40% LD641i | 1.0 | 60% Dowlex2045 + 40% LD641i | 0.5 | 2.0 |
| 17 | 85% Affinity 1880G + 10% Example 3 + 5% TiO2 | 0.5 | 60% Dowlex2045 + 40% LD641i | 1.0 | 60% Dowlex2045 + 40% LD641i | 0.5 | 2.0 |
| 18 | 90% Affinity 1880G + 10% Example 3 | 0.3 | 60% Dowlex2045 + 40% LD641i | 1.0 | 60% Dowlex2045 + 40% LD641i | 0.5 | 1.8 |

Test Method

Each of the panelists evaluated (touched) the samples and ranked the amount of Softness on a bi-polar scale of 1 to n, where n is the number of samples compared. A Ranking method with forced choice was used without allowing ties. Test information is shown in Table IX, below.

TABLE IX

| | |
|---|---|
| Number of panelists | 23 |
| Number of samples (n) | 4 |
| Test type | Ranking |
| Sample code numbers | Random 3 digit numbers not beginning with the numeral 1 or 0 |
| Test design | Random order of presentation - Williams Design |
| Sample use | Twelve sets of samples were prepared |

Sample Preparation

Films were not unblocked so the panelists touched only the outside layer of the film. 7×9.5 inch films were placed inside of a 7.5×11.5 inch folder that was sealed on three sides with one side left open, as shown in FIG. 1, which allowed the panelist to place their hand into the folder without seeing the film, thereby removing bias due to visual differences and allows the panelist to place their hand into the folder without seeing the film. Twelve sets of samples were prepared, used by the panelists. Three digit blinding codes were placed on the bottom edge folder. The samples were placed in the panelist booths using a random order of presentation.

Panelists

The human panel used for this evaluation was a trained panel comprised of employees of The Dow Chemical Company that were trained how to evaluate polyolefin product for haptics characteristics. They learned how to focus on one attribute at a time, rather than be overwhelmed by all the characteristics of the material at once and had the capability to determine differences between samples with very small differences and have been trained on the various handfeel techniques required for reliable, reproducible data.

Statistical Analysis

Each attribute was analyzed using an F-statistic in Analysis of Variance (ANOVA) to determine if there were any significant differences among the samples in the multiple comparisons. The F-ratio in the ANOVA indicated samples to be significantly different, so a Fisher's Least Significant Difference (LSD) was calculated to determine One-at-a-Time multiple comparisons. The Fisher's LSD test is used for pairwise comparisons when a significant F-value has been obtained. Statistical Analysis information is listed in Table X, below.

TABLE X

| Level of Error, α | Statistical Significance Level | Confidence Level that the result is not based solely on chance | Result |
|---|---|---|---|
| 0.10 | 10% | 90% | Low Significance |
| 0.05 | 5% | 95% | * Significant |
| 0.01 | 1% | 99% | ** Highly Significant |
| 0.001 | 0.1% | 99.9% | *** Very Highly Significant |

Attributes evaluated are listed in Table XIa, below.

TABLE XIa

| Attribute | Description and Bi-Polar Scale | Technique |
|---|---|---|
| Softness (Combines smoothness, stiffness, thickness, and compression) | The degree to which the sample is perceived as feeling soft. Not Soft ←--------→ Extremely Soft 1 ←--------- → 4 | Gently rub the film between the fingers and thumb. |

Conclusion

The data indicates that the 100% AFFINITY 1880 in the skin layer #1 (Example 15) film is significantly different from the other films and was ranked as the Least Soft sample. No statistical differences were detected between the other three films and they were ranked as the Most Soft samples. The results are shown in Table XII, below.

TABLE XII

| Sample Set | Example 15 | Example 16 | Example 17 | Example 18 |
|---|---|---|---|---|
| 1 | 1 | 3 | 2 | 4 |
| 2 | 1 | 4 | 2 | 3 |
| 3 | 1 | 2 | 4 | 3 |
| 4 | 1 | 4 | 3 | 2 |
| 5 | 1 | 2 | 3 | 4 |
| 6 | 1 | 4 | 2 | 3 |
| 7 | 1 | 3 | 2 | 4 |
| 8 | 1 | 2 | 4 | 3 |
| 9 | 4 | 2 | 3 | 1 |
| 10 | 1 | 4 | 2 | 3 |
| 11 | 4 | 3 | 2 | 1 |
| 12 | 1 | 2 | 3 | 4 |
| 13 | 1 | 4 | 3 | 2 |
| 14 | 1 | 3 | 4 | 2 |
| 15 | 1 | 2 | 3 | 4 |

TABLE XII-continued

| Sample Set | Example 15 | Example 16 | Example 17 | Example 18 |
|---|---|---|---|---|
| 16 | 4 | 3 | 1 | 2 |
| 17 | 1 | 2 | 4 | 3 |
| 18 | 1 | 2 | 4 | 3 |
| 19 | 1 | 4 | 3 | 2 |
| 20 | 1 | 4 | 2 | 3 |
| 21 | 1 | 2 | 3 | 4 |
| 22 | 1 | 4 | 3 | 2 |
| 23 | 1 | 2 | 3 | 4 |

As seen in the table above, 20 of 23 panelists rated Example 15 as 1 (the least soft), on the end of the scale. There were no statistical differences between Examples 16-18.

A cross-tabulation is shown in Table XIII, below.

TABLE XIII

| | Ranking | | | | |
|---|---|---|---|---|---|
| Sample | 1 | 2 | 3 | 4 | Total |
| Example 15 | 20 | | | 3 | 23 |
| Example 16 | | 10 | 5 | 8 | 23 |
| Example 17 | 1 | 7 | 10 | 5 | 23 |
| Example 18 | 2 | 6 | 8 | 7 | 23 |
| Totals | 23 | 23 | 23 | 23 | 92 |

The percentage cross-tabulation is shown in Table XIV, below.

TABLE XIV

| | Ranking | | | | |
|---|---|---|---|---|---|
| Sample | 1 | 2 | 3 | 4 | Total |
| Example 15 | 87.0% | | | 13.0% | 100% |
| Example 16 | | 43.5% | 21.7% | 34.8% | 100% |
| Example 17 | 4.4% | 30.4% | 43.5% | 21.7% | 100% |
| Example 18 | 8.7% | 26.1% | 34.8% | 30.4% | 100% |

The calculated Friedman statistic was 22.66. There were 3 degrees of freedom and the p-value was 0.000. The critical values corresponding to specific levels of significance were: 10%=6.25, 5%=7.81, and 1%=11.34.

TABLE XV

| | Fisher's LSD | | | | |
|---|---|---|---|---|---|
| Sample | Rank Total | Rank Mean | 10% Sig. level | 5% Sig. level | 1% Sig. level |
| Example 16 | 67.00 | 2.91 | a | a | a |
| Example 18 | 66.00 | 2.86 | a | a | a |
| Example 17 | 65.00 | 2.83 | a | a | a |
| Example 15 | 32.00 | 1.39 | b | b | b |

Part II

Examples 16-18 were then evaluated as a group.

Test Method

Each of the panelists evaluated (touched) the samples and ranked the amount of softness on a bi-polar scale of 1 to n, where n is the number of samples compared. A Ranking method with forced choice was used without allowing ties. Test information is shown in Table XVI, below.

TABLE XVI

| | |
|---|---|
| Number of panelists | 25 |
| Number of samples (n) | 3 |
| Test type | Ranking |
| Sample code numbers | Random 3 digit numbers not beginning with the numeral 1 or 0 |
| Test design | Random order of presentation - Williams Design |
| Sample use | Twelve sets of samples were prepared |

The Samples were prepared in the same manner as Part I.

Statistical Analysis

Each attribute was analyzed using an F-statistic in Analysis of Variance (ANOVA) to determine if there were any significant differences among the samples in the multiple comparisons. Statistical Analysis information is listed in Table X above, and the attributes evaluated are listed in Table XIb, below.

TABLE XIb

| Attribute | Description and Bi-Polar Scale | Technique |
|---|---|---|
| Softness (Combines smoothness, stiffness, thickness, and compression) | The degree to which the sample is perceived as feeling soft. Not Soft ←--------→ Extremely Soft 1 ←--------- → 3 | Gently rub the film between the fingers and thumb. |

Conclusion

Example 18 received the softest ranking value but no statistical differences were detected between the three films. All films had the same statistical perception of softness. The results are shown in Table XVII, below.

TABLE XVII

| Sample Set | Example 16 | Example 17 | Example 18 |
|---|---|---|---|
| 1 | 2 | 1 | 3 |
| 2 | 1 | 2 | 3 |
| 3 | 1 | 3 | 2 |
| 4 | 2 | 3 | 1 |
| 5 | 2 | 3 | 1 |
| 6 | 1 | 2 | 3 |
| 7 | 3 | 1 | 2 |
| 8 | 1 | 2 | 3 |
| 9 | 1 | 3 | 2 |
| 10 | 1 | 2 | 3 |
| 11 | 1 | 2 | 3 |
| 12 | 2 | 3 | 1 |
| 13 | 1 | 2 | 3 |
| 14 | 2 | 1 | 3 |
| 15 | 3 | 1 | 2 |
| 16 | 1 | 3 | 2 |
| 17 | 3 | 2 | 1 |
| 18 | 3 | 1 | 2 |
| 19 | 1 | 3 | 2 |
| 20 | 2 | 3 | 1 |
| 21 | 3 | 1 | 2 |
| 22 | 3 | 1 | 2 |
| 23 | 2 | 1 | 3 |
| 24 | 3 | 1 | 2 |
| 25 | 1 | 2 | 3 |

A cross-tabulation is shown in Table XVIII, below.

TABLE XVIII

| Sample | Ranking 1 | 2 | 3 | Total |
|---|---|---|---|---|
| Example 16 | 11 | 7 | 7 | 25 |
| Example 17 | 9 | 8 | 8 | 25 |
| Example 18 | 5 | 10 | 10 | 25 |
| Totals | 25 | 25 | 25 | 75 |

The percentage cross-tabulation is shown in Table XIX, below.

TABLE XIX

| Sample | Ranking 1 | 2 | 3 | Total |
|---|---|---|---|---|
| Example 16 | 44.0% | 28.0% | 28.0% | 100% |
| Example 17 | 36.0% | 32.0% | 32.0% | 100% |
| Example 18 | 20.0% | 40.0% | 40.0% | 100% |

The calculated Friedman statistic was 1.67. There were 2 degrees of freedom and the p-value was 0.432. The critical values corresponding to specific levels of significance were: 10%=4.61, 5%=5.99, and 1%=9.21.

TABLE XX

Fisher's LSD

| Sample | Rank Total | Rank Mean | 10% Sig. level | 5% Sig. level | 1% Sig. level |
|---|---|---|---|---|---|
| Example 18 | 55.00 | 2.20 | a | a | a |
| Example 17 | 49.00 | 1.96 | a | a | a |
| Example 16 | 46.00 | 1.84 | a | a | a |

The invention claimed is:

1. A blown film having at least one layer comprising a polymeric composition, the polymeric composition, comprising:

a) 80 to 99.5 percent by weight of a continuous polymeric phase comprising a polyolefin, and b) 0.5 to 20 percent by weight of polymeric particles having:

i) an average particle diameter of 0.85 to 20 μm;

ii) a refractive index from 1.46 to 1.61; and iii) at least 60 mole percent of acrylic monomer units wherein the blown film is characterized by having a thickness in the range of from 5 to 350 μm, a modulus of elasticity in the range of from 5 to 133 MPa, a melt strength in the range of from 4 to 40 cN, an elongation at break in the range of from 100 to 1000%, a 45 degree gloss in the range of from 7 to 36 and a softness measured by human panel handfeel-ranking methodology, measured by ISO 8587 Sensory analysis that is higher than a film which does not contain the polymeric composition.

2. The polymeric composition in accordance with claim 1, wherein the polyolefin is selected from the group consisting of polypropylene, polyethylene, polybutylene and copolymers and blends thereof.

3. The polymeric composition in accordance with claim 1, wherein the polymeric particles have a continuous refractive index gradient.

4. The polymeric composition in accordance with claim 3, wherein the polymeric particles have a refractive index at the surface from 1.46 to 1.61 and a refractive index at the center from 1.46 to 1.53.

5. The polymeric composition in accordance with claim 1, wherein the polymeric particles comprise at least 70 mole % of acrylic and styrenic monomer units.

6. A composition comprising the polymeric composition of claim 1 and a pigment selected from the group consisting of titanium dioxide, calcium carbonate, and mixtures thereof.

7. An article comprising the blown film according to claim 1.

8. The article according to claim 7, wherein the article is a flexible package selected from the group consisting of a bag, a flowpack, a pillow pouch, and a soft good overwrap.

* * * * *